(12) United States Patent
Hyronimus et al.

(10) Patent No.: US 8,806,846 B2
(45) Date of Patent: Aug. 19, 2014

(54) STEM DEFLECTOR

(75) Inventors: Brian J. Hyronimus, Huron, SD (US); Kim R. Tschetter, Cavour, SD (US); Lance C. Tschetter, Huron, SD (US)

(73) Assignee: Lankota Group, Inc., Huron, SD (US)

( * ) Notice: Subject to any disclaimer, the term of this patent is extended or adjusted under 35 U.S.C. 154(b) by 120 days.

(21) Appl. No.: 13/189,184

(22) Filed: Jul. 22, 2011

(65) Prior Publication Data
US 2013/0019581 A1   Jan. 24, 2013

(51) Int. Cl.
*A01D 63/00*   (2006.01)

(52) U.S. Cl.
CPC ..................................... *A01D 63/00* (2013.01)
USPC .......................................................... 56/314

(58) Field of Classification Search
USPC ............. 56/52, 105, 106, 119, 314, 320, 500, 56/504; 172/762, 763
See application file for complete search history.

(56) References Cited

U.S. PATENT DOCUMENTS

| | | | | |
|---|---|---|---|---|
| 1,687,953 | A | | 10/1928 | Starks |
| 2,593,780 | A | | 4/1952 | McIntosh |
| 2,691,859 | A | * | 10/1954 | Selby ................... 56/1 |
| 2,837,844 | A | | 6/1958 | Launder |
| 2,915,870 | A | | 12/1959 | Hume |
| 3,664,103 | A | * | 5/1972 | McNair ........................ 56/298 |
| 3,747,311 | A | * | 7/1973 | DeCoene et al. ............. 56/208 |
| 3,808,783 | A | * | 5/1974 | Sutherland et al. ............ 56/106 |
| 3,982,384 | A | * | 9/1976 | Rohweder et al. ............. 56/106 |
| 4,029,155 | A | | 6/1977 | Blair et al. |
| 4,144,698 | A | * | 3/1979 | Shelton ............................ 56/1 |
| 4,149,361 | A | * | 4/1979 | Pauletti et al. ................... 56/105 |
| 4,199,925 | A | | 4/1980 | Quick et al. |
| 4,269,018 | A | | 5/1981 | Pickett |
| 4,299,080 | A | | 11/1981 | Kelly |
| 4,384,378 | A | | 5/1983 | Getz et al. |
| 4,707,884 | A | | 11/1987 | Chang |
| 4,723,608 | A | * | 2/1988 | Pearson ........................ 172/430 |
| 4,884,940 | A | | 12/1989 | Steinkamp et al. |
| 5,040,616 | A | | 8/1991 | Hake |
| 5,481,835 | A | | 1/1996 | Bloom |
| 5,910,092 | A | | 6/1999 | Bennett |
| 5,943,850 | A | * | 8/1999 | Rourke ........................... 56/189 |
| 6,516,595 | B2 | | 2/2003 | Rhody et al. |
| 6,539,697 | B2 | * | 4/2003 | Burk ............................... 56/504 |
| 6,691,983 | B2 | | 2/2004 | Arzouman |
| 6,715,273 | B2 | | 4/2004 | Weichholdt |

(Continued)

OTHER PUBLICATIONS

Reference: http://www.facebook.com/pages/May-Wes-Manufacturing/130374240373694?closeTheater=1 "Stalk Stomper", Jun. 23, 2011.

(Continued)

*Primary Examiner* — Thomas B Will
*Assistant Examiner* — Joan D Misa
(74) *Attorney, Agent, or Firm* — Westman, Champlin & Koehler, P.A.

(57) ABSTRACT

A stem deflector having a mounting arm element including a first spring holder. A shoe, coupled to the mounting arm element, having an outer side, an inner side, a first end, a second end and a middle portion, the middle portion including a second spring holder on the inner side. A compression spring having a first end coupled to the first spring holder and a second end coupled to the second spring holder. The first spring holder and the second spring holder are substantially aligned along a same axis.

13 Claims, 5 Drawing Sheets

(56) References Cited

U.S. PATENT DOCUMENTS

| | | | |
|---|---|---|---|
| 6,883,299 B1 | 4/2005 | Gramm | |
| 7,036,441 B2 | 5/2006 | Scudder | |
| 7,063,341 B2 | 6/2006 | Tsai | |
| 7,156,186 B2 | 1/2007 | Knobloch et al. | |
| 7,373,768 B2* | 5/2008 | Sugden et al. | 56/249 |
| 7,419,171 B1 | 9/2008 | Ka Ming | |
| 7,631,477 B2* | 12/2009 | Eavenson et al. | 56/17.4 |
| 7,658,058 B2 | 2/2010 | Pierson | |
| 7,814,737 B2 | 10/2010 | Pierson | |
| 8,146,335 B2* | 4/2012 | Vandeven | 56/10.2 E |
| 8,171,707 B2* | 5/2012 | Kitchel | 56/52 |
| 8,201,388 B1* | 6/2012 | Vandeven et al. | 56/10.2 E |
| 2002/0112461 A1 | 8/2002 | Burk | |
| 2006/0242935 A1 | 11/2006 | Rayfiled et al. | |
| 2008/0031743 A1 | 2/2008 | Pappalardo et al. | |
| 2008/0276587 A1 | 11/2008 | Pierson | |
| 2010/0101200 A1 | 4/2010 | Pierson | |
| 2010/0205922 A1 | 8/2010 | Pierson | |
| 2011/0179758 A1 | 7/2011 | Kitchel | |
| 2011/0271653 A1 | 11/2011 | Vandeven | |
| 2013/0019581 A1 | 1/2013 | Hyronimus et al. | |
| 2013/0020100 A1* | 1/2013 | Shoup | 172/762 |
| 2013/0020101 A1* | 1/2013 | Shoup | 172/763 |
| 2013/0061569 A1* | 3/2013 | McClenathen | 56/52 |
| 2013/0125523 A1 | 5/2013 | Hyronimus et al. | |
| 2013/0174528 A1 | 7/2013 | Hyronimus et al. | |
| 2013/0174529 A1 | 7/2013 | Hyronimus et al. | |
| 2013/0177348 A1 | 7/2013 | Hyronimus et al. | |

OTHER PUBLICATIONS

Reference: http:/ndymfg.com/Products.php "Stalk Stomper", May 11, 2011.
Reference: http://morpheweb-server2.com/smasher/track_640x480px.jpg "Stalk Smasher", May 11, 2011.
"Lankota Old Stomper 1", available prior to Oct. 2005.
"Lankota Old Stomper 2", available prior to Oct. 2005.
Office Action from the U.S. Patent and Trademark Office dated Mar. 27, 2013, for U.S. Appl. No. 13/737,044.
Office Action from the U.S. Patent and Trademark Office dated May 23, 2013, for U.S. Appl. No. 13/737,030.
Final Office Action (Rejection) from U.S. Appl. No. 13/737,044, dated Jan. 14, 2014, 17 pages.
Final Office Action (Rejection) from U.S. Appl. No. 13/737,030, dated Jan. 29, 2014, 24 pages.
Farm & Ranch Guide, "Lakota Stalk Stomper", online search: Aug. 13, 2010, http://www.farmandranchguide.com/articles/2009/06/09/new_products/new24/txt (cited in PTO-892 of Jan. 14, 2014 for U.S. Appl. No. 13/737,044), 2 pages.
May Wes, "Stalk Stompers for Combines & Tractors", 2011 Catalog, 2011, online search: Nov. 3, 2013 (cited in PTO-892 of Jan. 14, 2014 for U.S. Appl. No. 13/737,044), 24 pages.
May Wes Manufacturing, "May Wes Stalk Stompers for tractor tire stubble damage protection; Protect Tractor Tracks and Tires from Stubble Damage with May Wes Tractor Stalk Stompers", online search: Jun. 21, 2011, http://www.maywes.com/stalk_stompers_tractors, 2 pages.
May Wes, "41688 Lift Arm Assy; Tractor Stalk Stomper Parts Listing", online search: Nov. 3, 2013(cited in PTO-892 of Nov. 12, 2013 for U.S. Appl. No. 13/769,758), http://www.maywes.com/uploadedcontent/documents/393.pdf, 4 pages.
May Wex, "Tractor Stalk Stomper Hydraulic Schematic", online search: Nov. 3, 2013, http://www.maywes.com/uploadedcontact/documents/546.pdf (cited in PTO-892 of Nov. 12, 2013 for U.S. Appl. No. 13/769,758).
May Wes Manufacturing, "May Wes Stalk Stompers for tractor tire stubble damage protection; Protect Tractor Tracs and Tires from Stubble Damage with May Wes Tractor Stalk Stompers", online search: Nov. 3, 2013, http://www.maywes.com/stalk_stompers_tractors (cited in PTO-92 of Nov. 12, 2013 for U.S. Appl. No. 13/769,758), 24 pages.
Office Action (Rejection) from U.S. Appl. No. 13/769,758, dated Nov. 12, 2013, 10 pages.
Final Office Action (Rejection) from U.S. Appl. No. 13/769,758, dated Mar. 20, 2014, 11 pages.

\* cited by examiner

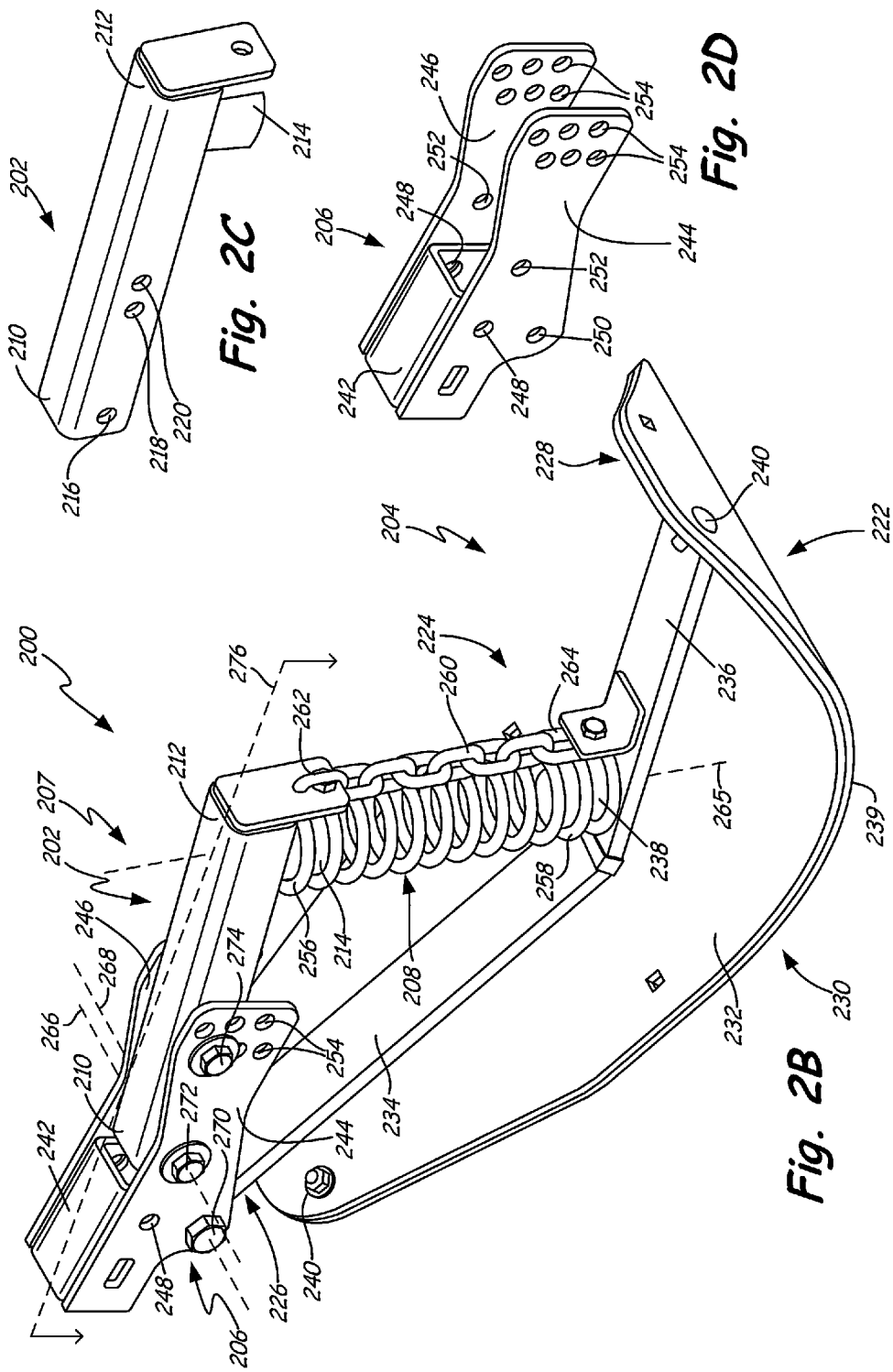

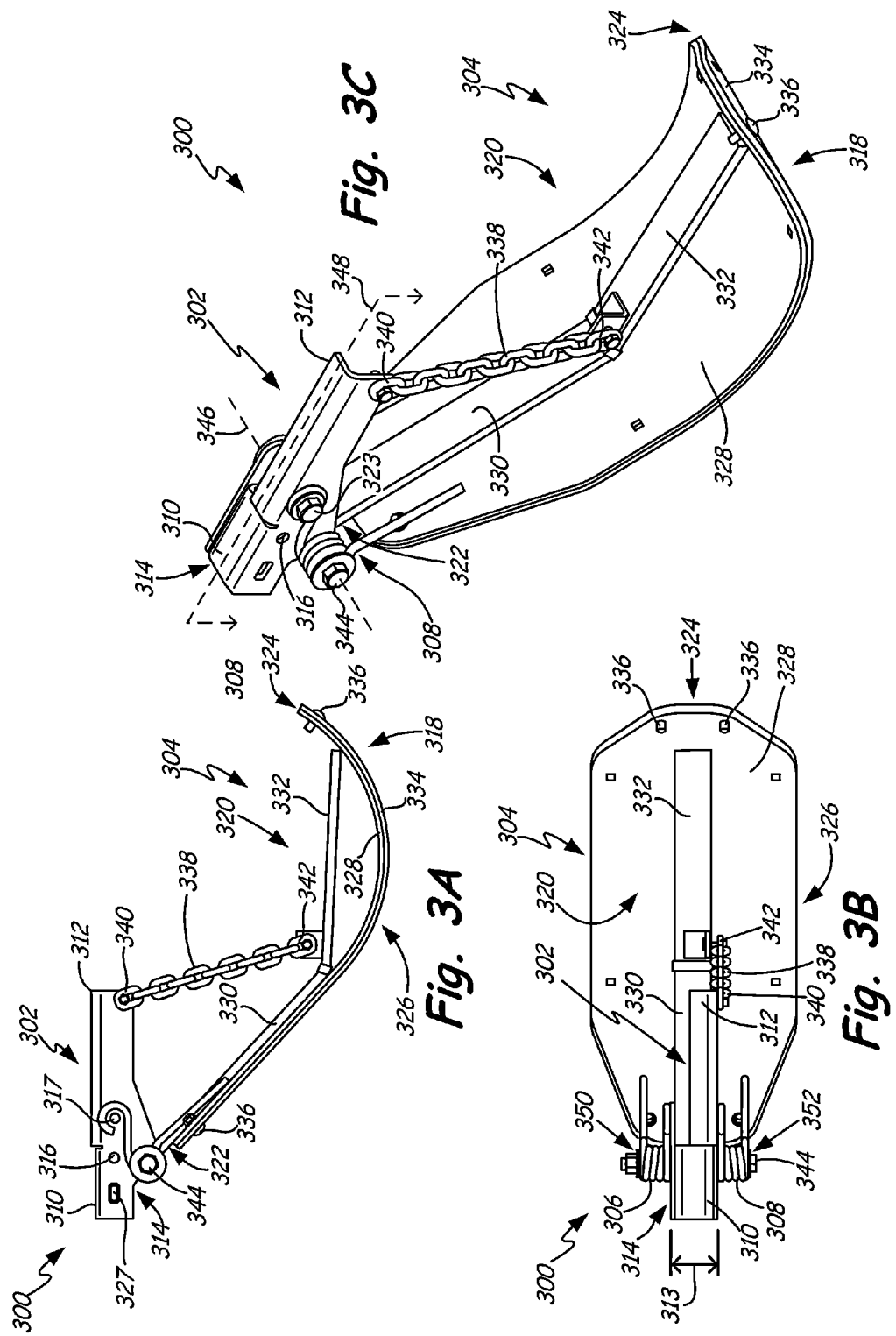

STEM DEFLECTOR

FIELD

The present embodiments relate generally to agricultural equipment and more particularly to stem deflectors that are utilized with crop harvesting machines, for example.

BACKGROUND

Stem deflectors are utilized with crop harvesting machines such as combine harvesters. A combine harvester, or simply combine, is a machine that harvests grain crops. It combines into a single operation a process that previously required three separate operations (reaping, threshing, and winnowing). Among the crops harvested with a combine are wheat, oats, rye, barley, corn (maize), soybeans and flax (linseed). Combines are equipped with removable heads that are designed for particular crops.

Stem deflectors are units that mount to a rear of a combine head (for example, a corn head). A stem deflector bends over the remaining stem after the head has harvested the ear of corn, for example. Stem deflectors typically include springs that bias a shoe against the earth for bending or crushing the stems as the combine travels in a forward direction. These springs are in a substantially compressed state when the stem deflector bends or crushes the stems. In some such stem deflectors, holders for the springs are positioned such that severe compression can cause the springs to "kink-out" or bow to one side, which is undesirable.

Exemplary embodiments of the disclosure address these and other problems, and offer other advantages over the prior art.

SUMMARY

One embodiment is directed to a stem deflector, which includes an arm and a shoe having a first end and a second end. The first end of the shoe is coupled to the arm with a fastener. At least one torsion spring is active between the arm and the shoe.

Another embodiment is directed to a stem deflector that includes a mounting arm element that has a first spring holder. The stem deflector also includes a shoe, coupled to the mounting arm element, having an outer side, an inner side, a first end, a second end and a middle portion. The middle portion of the shoe includes a second spring holder on the inner side. The stem deflector further includes a compression spring having a first end coupled to the first spring holder and a second end coupled to the second spring holder. The first spring holder and the second spring holder are substantially aligned along a same axis.

This summary is not intended to describe each disclosed embodiment or every implementation of the stem deflector. Many other novel advantages, features, and relationships will become apparent as this description proceeds. The figures and the description that follow more particularly exemplify illustrative embodiments.

BRIEF DESCRIPTION OF THE DRAWINGS

FIG. 2B is a perspective view of the stem deflector of FIG. 2A.

FIG. 2C is a perspective view of an arm of the stem deflector of FIG. 2A.

FIG. 2D is a perspective view of a mounting bracket of the stem deflector of FIG. 2A.

FIG. 3A is a side elevation view of a stem deflector in accordance with another embodiment.

FIG. 3B is a top plan view of a stem deflector of FIG. 3A.

FIG. 3C is a perspective view of the stem deflector of FIG. 3A.

While the above-identified figures set forth certain embodiments of the stem deflector, other embodiments are also contemplated, as noted in the disclosure. In all cases, this disclosure presents the stem deflector by way of representation and not limitation. It should be understood that numerous other modifications and embodiments can be devised by those skilled in the art which fall within the scope and spirit of the principles of this disclosure.

DETAILED DESCRIPTION OF ILLUSTRATIVE EMBODIMENTS

Figure 1:
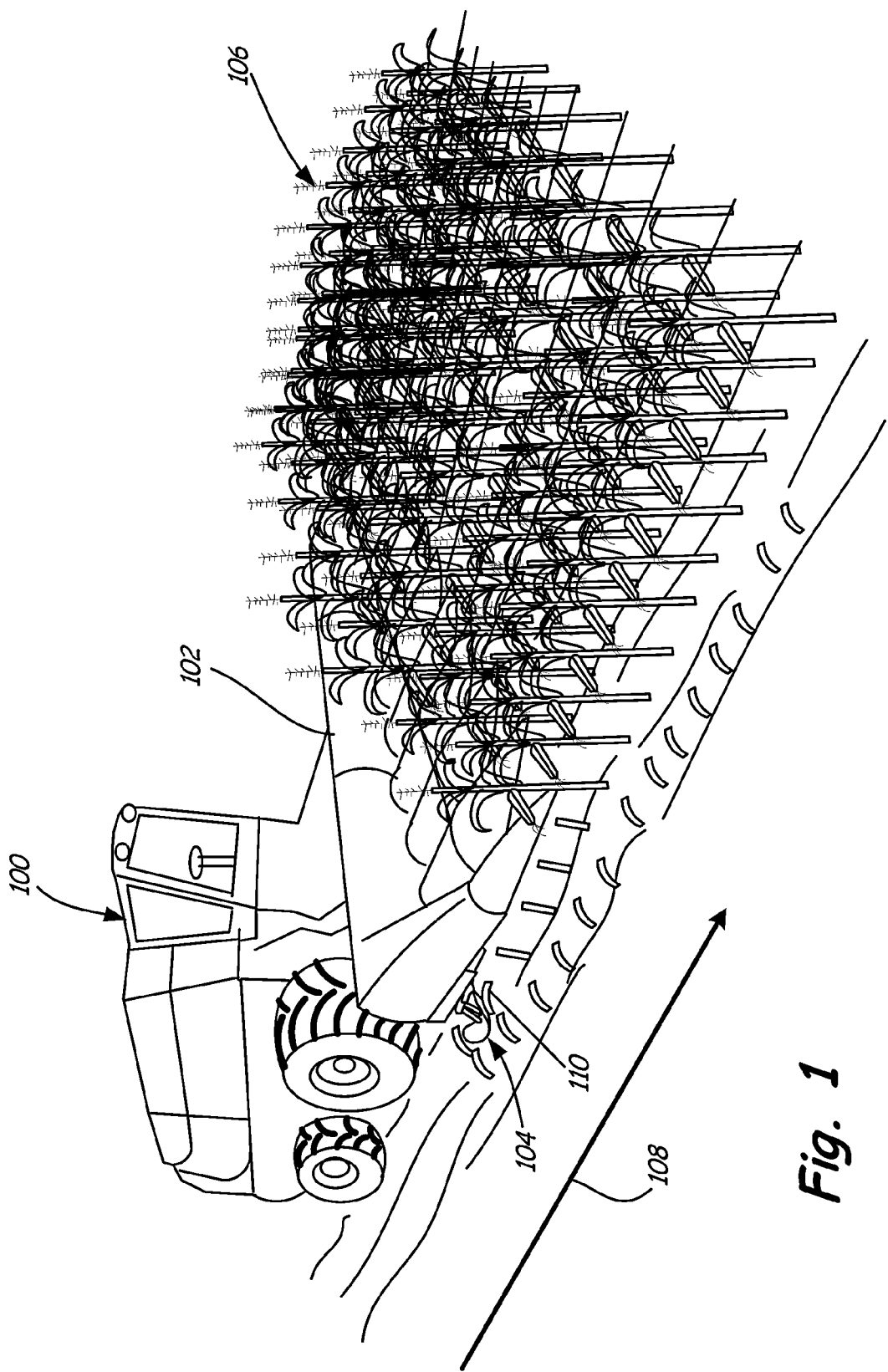
FIG. 1 is a diagrammatic illustration of a combine harvester with a connected head to which a stem deflector is coupled.

FIG. 1 is a diagrammatic illustration of a combine harvester 100 with a connected head 102 to which a set of stem deflectors 104 is coupled. In FIG. 1, combine harvester 100 is shown harvesting crop (corn, for example) 106 in a direction shown by arrow 108. Stem deflector 104 is shown crushing a stem 110 as the crop is being harvested. FIGS. 2A through 2D and 3A through 3C show different embodiments of stem deflectors.

Figure 2A:
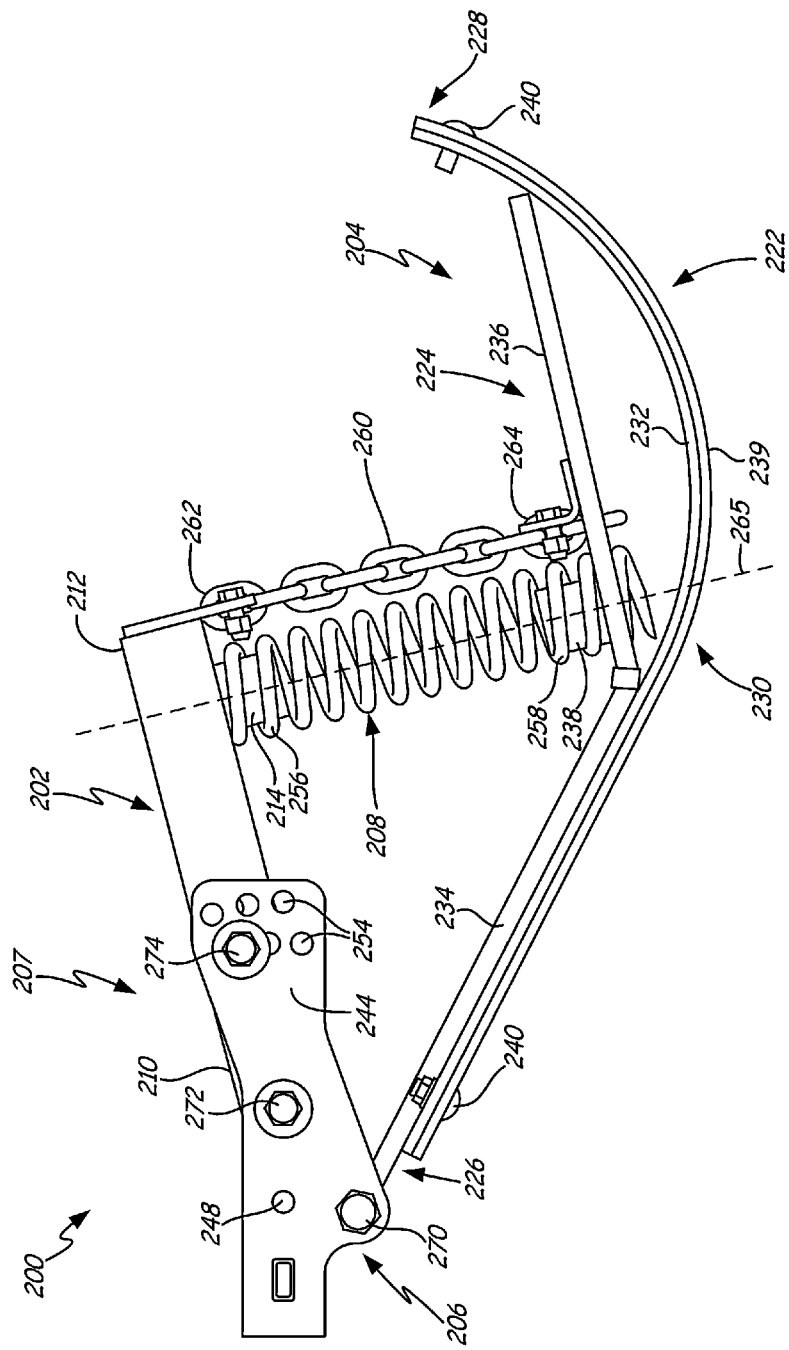
FIG. 2A is a side elevation view of a stem deflector in accordance with one embodiment.

FIGS. 2A and 2B show different views of a stem deflector 200 in accordance with one embodiment. As will be described below, stem deflector 200 has compression spring holders positioned such that a compression spring does not bow to one side when severely compressed. As can be seen in FIGS. 2A and 2B, stem deflector 200 includes an arm 202, a shoe 204, a mounting bracket 206 to which arm 202 and shoe 204 are coupled, and a compression spring 208 that operates between arm 202 and shoe 204. Arm 202 and mounting bracket 206 together constitute a mounting arm element 207, which may include a plurality of pieces of material connected together or a single piece of material. Stem deflector 200 can be coupled to a combine harvester head (such as 102 of FIG. 1) with the help of mounting bracket 206, which is typically mounted on another set of brackets that attach component 206 to the combine harvester head.

FIG. 2C is a diagrammatic illustration of arm 202 of stem deflector 200. As can be seen in FIGS. 2A, 2B and 2C, arm 202 has a first end 210 and a second end 212. Arm 202 includes a first spring holder 214 proximate second end 212. Arm 202, with the help of first spring holder 214, holds spring 208 in place so that spring 208 can properly bias shoe 204 against the earth for bending or crushing stems. In some embodiments, arm 202 may be a hollow arm made of any suitable metal or other material. In other embodiments, arm 202 may be a solid arm made of any suitable metal or other material. As can be seen in FIG. 2C, arm 202 includes channels or bores 216, 218 and 220 that extend through arm 202. Bores 216, 218 and 220 receive fasteners (for example, bolts) that couple arm 202 to mounting bracket 206. It should be noted that, if arm 202 is hollow, each of features 216, 218 and 220 includes coaxially-aligned holes on opposing sides of hollow arm 202. Specifics regarding coupling of arm 202 to mounting bracket 206 are provided further below.

As noted above, stem deflector 200 includes a shoe 204 for crushing and bending stems. Referring to FIGS. 2A and 2B, shoe 204 has an outer side 222, an inner side 224, a first end 226, a second end 228 and a middle portion 230. Components of shoe 204 can include a base 232, which may be substantially convex on outer side 222, a connection bar 234, a reinforcement bar 236 and a second spring holder 238 that may be coupled to, or integrally formed with, reinforcement bar 236. Connection bar 234 is coupled to base 232 and to reinforcement bar 236. Reinforcement bar 236 helps distribute forces substantially evenly to different parts of shoe 204 while it is biased against the earth to bend or crush stems. Shoe 204 may be made of any suitable metal or other material. In one embodiment, both arm 202 and shoe 204 are made of a same material. In some embodiments, shoe 204 includes a cover 239 that is connected to base 232 of shoe 204 on outer side 222. In one embodiment, cover 239 comprises polyethylene. Of course, any other suitable material or combination of materials may be employed to form cover 239. Cover 239 is replaceable and may be held in place with the help of carriage bolts 240 or any other suitable fasteners. Cover 239, which is substantially cheaper to replace than the rest of shoe 204, protects base 232 of shoe 204 form wearing during operation. Also, a material such as polyethylene of which cover 239 may be formed is less prone to dirt build up than a metal base 232 of shoe 204.

FIG. 2D is a diagrammatic illustration of mounting bracket 206 of stem deflector 200. Mounting bracket 206 includes a frame piece 242 and two opposing flanges 244 and 246 coupled to frame piece 242. Mounting bracket 206 may be made of metal or of any other suitable material. In one embodiment, mounting bracket 206 is made of a same material as arm 202 and shoe 204. Mounting bracket 206 includes multiple aligned holes such as mounting holes 248, coupling holes 250 and 252 and an array of adjustment holes 254 in flanges 244 and 246. Mounting holes 248 receive fasteners (for example, bolts) for coupling mounting bracket 206 to a combine harvester head (such as 102 of FIG. 1). Coupling holes 250 and 252 receive fasteners (for example, bolts) that couple shoe 204 and arm 202, respectively, to mounting bracket 206. Adjustment holes 254, which accept a pin (a bolt, for example), are employed for adjusting a position of arm 202 relative to shoe 204. Different adjustment positions of arm 202 produce different levels of compression in spring 208. Details regarding arm position adjustments are provided further below.

As noted above, compression spring 208 operates between arm 202 and shoe 204. Compression spring 208 may be made out of steel or any other suitable material. A first end 256 of compression spring 208 is mounted around or connected to first spring holder 214 and a second end 258 of compression spring 208 is mounted around or connected to second spring holder 238.

Stem deflector 200 may further include a containing chain 260 that has a first end 262 coupled to second end 212 of arm 202 and a second end 264 coupled to reinforcement bar 236. The length of chain 260 sets a maximum separation distance between second end 212 of arm 202 and reinforcement bar 236.

As indicated earlier, stem deflector 200 is designed and assembled such that first spring holder 214 and second spring holder 238 are positioned in a manner that compression spring 208 does not bow to one side when severely compressed. Specifically, to prevent compression spring 208 from bowing to one side, first spring holder 214 and second spring holder 238 are substantially aligned along a same axis 265 as shown in FIGS. 2A and 2B. Details regarding how components of stem deflector 200 are operably coupled together are provided below.

In the embodiment shown in FIGS. 2A and 2B, arm 202 and shoe 204 are each pivotally coupled to mounting bracket 206, using suitable fasteners, along pivot axes 266 and 268 (shown in FIG. 2B), respectively. Specifically, connection bar 234 of shoe 204 is coupled to mounting bracket 206 at first end 226 of shoe 204 by a bolt 270 that passes through coaxially aligned holes 250 (shown in FIG. 2D) in mounting bracket 206 and through connection bar 234 of shoe 204 along pivot axis 266 (shown in FIG. 2B). Similarly, first end 212 of arm 202 is coupled to mounting bracket 206 by a bolt 272 that passes through coaxially aligned holes 252 (shown in FIG. 2D) in mounting bracket 206 and through bore 216 in arm 202 along pivot axis 268 (shown in FIG. 2B). In this embodiment, arm 202 is pivotal in a plane 276 (shown in FIG. 2B) that is perpendicular to pivot axis 268 (shown in FIG. 2B). In one embodiment, pivotal movement of arm 202 is limited to vertical plane 276 (shown in FIG. 2B). As noted above, opposing flanges 244 and 246 also include aligned adjustment holes 254. As can be seen in FIGS. 2A and 2B, adjustment holes 254 are arranged in columns within a plane parallel to vertical plane 276 (shown in FIG. 2B). A position/location of arm 202 in vertical plane 276 (shown in FIG. 2B) can be adjusted to enable compression spring 208 to apply a suitable biasing force on shoe 204 by moving arm 202 about pivot axis 268 (shown in FIG. 2B) and inserting a bolt 274 through a respective pair of adjustment holes 254 and bore 218, 220 (shown in FIG. 2C) of arm 202.

It should be noted that, although stem deflector 200 is shown as including an array of two columns of three vertically aligned adjustment holes and two corresponding bores, any suitable number or arrangement of holes and bores may be used. It should also be noted that, in some embodiments, connection bar 232 of shoe 204 and arm 202 may be connected to mounting bracket 206 on a same pivot axis using a single bolt rather than on two different pivot axes 266 and 268 (shown in FIG. 2B) with separate bolts 270 and 272.

Stem deflectors 200 are employed on surfaces of the earth that may be fairly uneven, and therefore forces on compression spring 208 typically vary as shoe 204 moves along the earth while bending or crushing stems. In illustrative embodiments, as shoe 204 pivots about axis 266, compression spring 208 compresses linearly. In some embodiments, axis 265 is aligned with a central axis (not shown separately) of compression spring 208. It should be noted that, in illustrative embodiments, first spring holder 214 and second spring holder 238 are substantially aligned along same axis 265 when spring 208 is in a fully extended and/or compressed state (as shown in FIGS. 2A and 2B), as limited by containing chain 260. It should further be noted that first spring holder 214 and second spring holder 238 may also be substantially aligned along same axis 265 when spring 208 is at a intermediate compression state along a travel path between the fully extended and fully compressed states. In general, first spring holder 214 and second spring holder 238 are substantially aligned along same axis 265 when spring 208 is in at least one of the fully extended, the fully compressed or the intermediate states. It should be noted that the fully extended state of spring 208 is defined by the length of chain 260. Although second spring holder 238 travels along an arc when shoe 204 compresses spring 208 toward first spring holder 214, its axis remains substantially aligned with that of first spring holder 214 over the relatively short travel compression distance such that spring 208 does not kink-out or bow during compression.

FIGS. 3A, 3B and 3C show different views of a stem deflector 300 in accordance with one embodiment. In this exemplary embodiment, stem deflector 300 does not include any compression spring, but instead employs one or more torsion springs that bias a shoe against the earth. Thus, in this embodiment, the problem of potential bowing to one side of compression springs under severe compression is addressed by completely eliminating compression springs from stem deflector 300. As will be discussed in detail further below, stem deflector 300 is, in general, less complex than stem deflector 200 of FIGS. 2A and 2B.

Stem deflector 300 includes an arm 302, a shoe 304 and at least one torsion spring 306, 308 (shown in FIG. 3B) that is active between arm 302 and shoe 304. As indicted above, in this embodiment, torsion spring 306, 308 biases shoe 304 against the earth for bending or crushing the stems as the combine travels in a forward direction.

Arm 302 has a first end 310, a second end 312 and a width 313 (shown in FIG. 3B). As in the case of arm 202 of stem deflector 200 (shown in FIGS. 2A and 2B), arm 302 may be hollow or solid and may be formed of any suitable material. However, unlike stem deflector 200, in which the arm and the mounting bracket may be separate, arm 302 of stem deflector 300 includes an integrated mounting bracket 314 at first end 310. Mounting bracket portion 314 may have a rectangular cross-section, inverted U-shaped cross-section, or may be of any other suitable configuration. A remaining portion of arm 302 including second end 312 may have an L-shaped cross-section or any other suitable cross-section. Mounting bracket portion 314 of arm 302 includes multiple holes or bores 316 which can receive fasteners that couple stem deflector 300 to a combine harvester head (such as 102 of FIG. 1). Also, some of holes 316, which can receive fasteners that couple shoe 304 to arm 302 and can be used to mount torsion spring 306, 308 between arm 302 and shoe 304, cannot be seen in FIGS. 3A through 3C as a result of being covered by a fastener. A rectangular slot 327 (shown in FIG. 3A) is employed for plug welding. Additional holes or bore 317 (shown in FIG. 3A) may be included in arm 302 to receive a fastener that holds an arm of torsion springs 306 and 308 in place. The coupling of torsion springs 306 and 308 to arm 302 is described further below.

As noted above, stem deflector 300 also includes shoe 304, which is similar to shoe 204 (shown in FIGS. 2A and 2B) and may be formed of a metal or any other suitable material. As in the case of shoe 204, shoe 304 has an outer side 318, an inner side 320, a first end 322, a second end 324 and a middle portion 326. Components of shoe 304, which are substantially similar to the components of shoe 204, include a base 328, which may be substantially convex on outer side 318, a connection bar 330, a reinforcement bar 332 and a shoe cover 334, which is held in place with the help of carriage bolts 336. Connection bar 330 is coupled to base 328 and may be integrally formed with, or coupled to, reinforcement bar 332. These components of shoe 304 are functionally similar to the components of shoe 204 and therefore component functional details are not repeated.

Figure 3D:
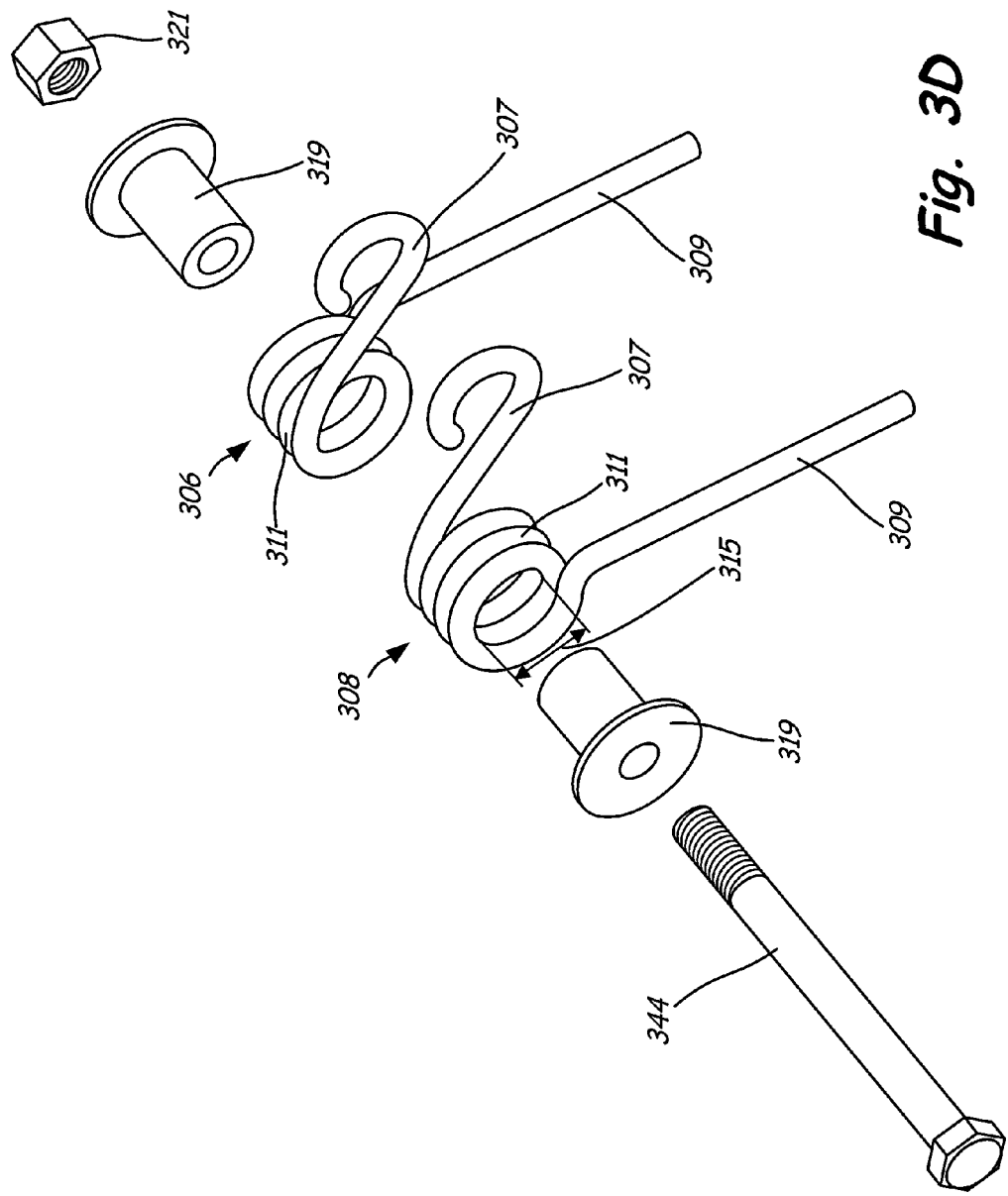
FIG. 3D is an exploded view of a torsion spring and bolt of the stem deflector of FIG. 3A.

As noted above, torsion spring 306, 308 operates between arm 302 and shoe 304, as shoe 304 pivots relative to arm 302 about an axis 346 defined by bolt 344. Torsion spring 306, 308 includes, for example, a torsion bar or a helical torsion spring. Torsion spring 306, 308 may be made out of steel or any other suitable material. FIG. 3D shows an exploded view of torsion spring 306, 308 and bolt 344. As can be seen in FIG. 3D, torsion spring 306, 308 includes an anchor arm 307, a working arm 309 and a coil 311. Coil 311 has an inner diameter 315. Bolt 344 extends through a bushing or standoff 319 and through inner diameter 315 of coil 311. Working arm 309 moves to twist coil 311 as shoe 304 pivots about axis 346. It should be noted that, although torsion springs 306 and 308 are shown mounted around bolt 344 along axis 346, in some embodiments, torsion springs 306 and 308 may be mounted around a different fastener (not shown) that is connected through arm 302 along a different axis than axis 346 about which shoe 304 rotates. Additional details regarding mounting and operation of torsion spring 306, 308 are included further below.

As in the case of stem deflector 200, stem deflector 300 may further include a containing chain 338 that has a first end 340 coupled to second end 312 of arm 302 and a second end 342 coupled to reinforcement bar 332. Chain 338 has a similar function as chain 260 of stem deflector 200. Details regarding how primary components of stem deflector 300 are operably coupled together are provided below.

In the exemplary embodiment of FIGS. 3A, 3B and 3C, first end 322 of shoe 304 is pivotally coupled to first end 310 of arm 302 by fastener (for example, a bolt) 344 along pivot axis 346 (shown in FIG. 3C). In this embodiment, shoe 304 is pivotal in a plane 348 (shown in FIG. 3C) that is perpendicular to pivot axis 346. In one embodiment, pivotal movement of shoe 304 is limited to vertical plane 348 (shown in FIG. 3C). In the embodiment of FIGS. 3A, 3B and 3C, torsion springs 306 and 308 are mounted around portions 350 and 352 (shown in FIG. 3B), respectively, of bolt 344 that extend beyond the width 313 of arm 302.

Mounting of torsion springs 306 and 308 can be carried out by first inserting bolt 344 into bushing 319 and through torsion spring 308 such that bolt 344 extends through an inner diameter 315 (shown in FIG. 3D) of coil 311 (shown in FIG. 3D) and such that coil 311 (shown in FIG. 3D) of torsion spring 308, when mounted, is around portion 352 (shown in FIG. 3B) of bolt 344. Next, a portion of bolt 344 that extends beyond portion 352 (shown in FIG. 3B) is inserted through one aligned pair of holes 316 in mounting bracket portion 314 such that portion 350 (shown in FIG. 3B) of bolt 344 extends beyond width 313 (shown in FIG. 3B) of mounting bracket portion 314 of arm 304. Torsion spring 306 is then mounted around extended portion 350 (shown in FIG. 3B) of bolt 344 in a manner similar to torsion spring 308. A nut 321 (shown in FIG. 3D) is then suitably positioned around bolt 344, and nut 321 (shown in FIG. 3D) is tightened to hold the assembly in place. Anchor arms 307 (shown in FIG. 3D) of torsion springs 306 and 308 are then fixed in a stationary position by inserting bolt 323 (shown in FIG. 3C) into bore 317 (shown in FIG. 3A) and suitably connecting, for example, a nut (not shown) to bolt 323 (shown in FIG. 3C). It should be noted that torsion springs 306 and 308 are mounted such that working arms 309 of torsion springs 306 and 308 rest against an inner surface of shoe 304, for example. As noted above, working arm 309 moves to twist coil 311 (shown in FIG. 3D) as shoe 304 pivots about axis 346.

It should be noted that, although stem deflector 300 is shown as including two torsion springs 306 and 308 mounted around extended portions 350 and 352 (shown in FIG. 3B), respectively, of bolt 344, any suitable number or arrangement of torsion springs may be used.

Stem deflector 300 has several optional advantages over stem deflector 200 (of FIGS. 2A and 2B). As described above, stem deflector 300 includes features such as arm 302 and shoe 304, which are similar to arm 202 and shoe 204 of stem deflector 200 (of FIGS. 2A and 2B), but includes no compression spring (such as 208 of FIGS. 2A and 2B). Instead, as described above, stem deflector 300 includes at least one torsion spring 316, 318. The use of at least one torsion spring allows for the application of a suitable/proper force during operation through a wider range of motion, for example, between arm 302 and shoe 304 compared to a range of motion provided between arm 202 and shoe 204 of stem deflector 200. Stem deflector 300 requires no end-user adjustment of a separation distance between arm 302 and shoe 304 for different stem deflector height or downward force requirements.

The use of torsion springs also permits elimination of several components such as mounting flanges, an arm with bores for pivotally connecting the arm to the mounting flanges, arm position adjustment features such as adjustment bolts, etc. This not only simplifies manufacturing, but may also increase reliability in some embodiments.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the stem deflector while maintaining substantially the same functionality without departing from the scope and spirit of the present disclosure.

What is claimed is:

1. A stem deflector comprising:
    a mounting arm element including an arm and a mounting bracket that is a separate piece from the arm, wherein the arm includes a first end pivotally coupled to the mounting bracket about a pivot axis, and wherein the arm is pivotal in a plane perpendicular to the pivot axis, and wherein the arm includes a first spring holder that is spaced apart from the first end of the arm;
    a shoe having an outer side, an inner side, a first end, a second end and a middle portion, the middle portion including a second spring holder on the inner side, wherein the first end of the shoe is coupled to the mounting bracket; and
    a compression spring having a first end coupled to the first spring holder and a second end coupled to the second spring holder,
    wherein the first spring holder and the second spring holder are substantially aligned along a same axis.

2. The stem deflector of claim 1 and wherein the first spring holder and the second spring holder are substantially aligned along the same axis when the spring is in a fully compressed state.

3. The stem deflector of claim 1 and wherein the first spring holder and the second spring holder are substantially aligned along the same axis when the spring is in a fully extended state.

4. The stem deflector of claim 3 and further comprising a containing chain having first and second ends and a length therebetween, the first end of the chain is coupled to the mounting arm element and the second end of the chain is coupled to the shoe, wherein the fully extended state of the spring is defined by the length of the containing chain.

5. The stem deflector of claim 1 and wherein the first spring holder and the second spring holder are substantially aligned along the same axis when the spring is in an intermediate state along a travel path between a fully extended state and a fully compressed state.

6. The stem deflector of claim 1 and wherein the same axis is aligned with a central axis of the compression spring.

7. The stem deflector of claim 1 and wherein the compression spring compresses linearly along the central axis.

8. The stem deflector of claim 1 and further comprising an adjustment means for pivotally adjusting a position of the arm relative to the shoe in the plane perpendicular to the pivot axis.

9. The stem deflector of claim 8 and wherein the adjustment means comprises:
    an array of aligned pairs of adjustment holes in a pair of opposing flanges of the mounting bracket, the adjustment holes being parallel to the plane perpendicular to the pivot axis;
    at least one bore that extends through in the arm, wherein the bore is substantially parallel to the pivot axis, and wherein the bore is in a portion of the arm that is between the opposing flanges; and
    a pin that extends through the bore and through any aligned pair of adjustment holes of the array of aligned pairs of adjustment holes.

10. The stem deflector of claim 9, wherein the array of aligned pairs of adjustment holes comprises a plurality of columns of aligned pairs of adjustment holes, and wherein the at least one bore comprises a plurality of bores with each of the plurality of bores corresponding to a different one of the plurality of columns of aligned pairs of adjustment holes.

11. The stem deflector of claim 10, wherein the plurality of columns of aligned pairs of adjustment holes comprises a first column of aligned pairs of adjustment holes and a second column of aligned pairs of adjustment holes proximate the first column of aligned pairs of adjustment holes, and wherein the plurality of bores comprises a first bore corresponding to the first column of aligned pairs of adjustment holes and a second bore corresponding to the second column of aligned pairs of adjustment holes.

12. The stem deflector of claim 1 and wherein the shoe is connected to the mounting bracket along a different pivot axis than the pivot axis along which the arm is connected to the mounting bracket.

13. The stem deflector of claim 1 and wherein the shoe is connected to the mounting bracket along the pivot axis along which the arm is connected to the mounting bracket.

* * * * *